United States Patent [19]

Davis et al.

[11] 4,001,654
[45] Jan. 4, 1977

[54] TESTABLE PROTECTIVE SYSTEM

[75] Inventors: Mark A. Davis, Orchard Park; Markus A. Eggenberger; Jens Kure-Jensen, both of Schenectady, all of N.Y.

[73] Assignee: General Electric Company, Schenectady, N.Y.

[22] Filed: July 31, 1975

[21] Appl. No.: 600,835

[52] U.S. Cl. .......................... 317/135 R; 307/115; 307/204; 307/219; 324/28 R; 317/135 A
[51] Int. Cl.² ................... H02H 3/00; H01H 47/00
[58] Field of Search ................... 317/135 R, 135 A; 324/28 R, 28 CB; 176/24; 307/113, 115, 118, 144, 204, 219

[56] References Cited
UNITED STATES PATENTS

| 3,223,590 | 12/1965 | Troeger | 317/135 A |
| 3,748,540 | 7/1973 | Eggenberger et al. | 317/135 R |

*Primary Examiner*—J. D. Miller
*Assistant Examiner*—Patrick R. Salce
*Attorney, Agent, or Firm*—James W. Mitchell; John F. Ahern

[57] ABSTRACT

A testable protective system for an operating system is provided with redundant trip components serially connected to redundant lock-out components. The trip components are signalled by fault sensors which monitor critical conditions of the operating system. These trip components produce an output indicative of such conditions, which output is fed to certain actuated devices which may either correct the condition or shut down the operating system until the cause of the problem can be determined and the necessary repairs made. When it is desired to test one of these trip components, the operator activates the corresponding lock-out component and performs the necessary test. The activation of this lock-out component has an effect of making the protective system output signal (the output to the actuated devices to correct the fault or shut the system down) independent of the output of that trip component when it is being tested. Should an operator mistakenly activate both lock-out components at once, the protective system output signal is a function only of the fault sensor input to a first trip component and a driving signal to the protective system. Thus, even if both lock-out components are activated at once, a fault signal to the first trip component will effect a fault output signal from the protective system to the actuated devices.

4 Claims, 3 Drawing Figures

TESTABLE PROTECTIVE SYSTEM

BACKGROUND OF THE INVENTION

1. Field of the Invention

This invention relates generally to protective systems for operating systems and more specifically to monitoring and testing the protective system while maintaining protection of the operating system.

2. Description of the Prior Art

In operating systems, such as steam turbine-generator systems, it has been the practice to provide various fault sensors to monitor certain critical conditions of the system such as turbine speed, electrical load, steam pressure, etc. These fault sensors feed this information to cooperating protective systems which, in the event of failure or faulty operation of the operating system, actuate devices which may either correct the condition or shut down the operating system until the cause of the problems can be determined and the necessary repairs to the operating system made.

It has been the practice to provide redundancy in such protective systems so that one component of the system may be tested while a second component protects the operating system. To test a component of the protective system, it has been the practice to feed that component a signal similar to that intended to actuate it in operation, or, in other words to feed it a simulated fault signal. In the prior art, these components were connected in series so that testing one of them would not cause the protective system to sense a fault and actuate the cooperating actuated devices. This was known as a logical AND arrangement because it was necessary for both components to be actuated to complete the circuit. Such prior art protective systems had a significant shortcoming associated with them. In order to trip the prior art protective systems in an actual fault situation it was necessary to trip both of the serially connected components. Therefore, if one of the components failed to function properly by failing to trip, the protective system itself would not trip, and the fault information would not be fed to the devices which either correct the fault or shut the operating system down.

A protective system disclosed in U.S. Pat. No. 3,748,540 overcame this shortcoming associated with such prior art protective systems in that, with the protective system disclosed in that patent, a protective system component could be tested without tripping the operating system and failure of one such component would not cause the protective system to fail to trip so long as the other components of the protective system functioned normally.

However, such prior art protective systems could be rendered totally inoperative if all the system components were locked out (effectively removed from the protective system) for testing.

Therefore, it is an object of the present invention to provide an improved protective system wherein a mistaken attempt to simultaneoulsy lock out both of the redundant components will not cause the protective system to be inoperative.

It is another object of the present invention to provide an improved protective system wherein a testing of one of the redundant components will nevertheless allow the system to be responsive through the remaining component to any actual fault which might occur during such a testing.

SUMMARY OF THE INVENTION

The objects of the present invention are attained by providing in a protective system for an operating system, redundant trip components serially connected to redundant lock-out components. The trip components are signalled by fault sensors which monitor critical conditions of the operating system. These trip components produce an output indicative of such conditions, which output is fed to certain actuated devices which may either correct the condition or shut down the operating system until the cause of the problem can be determined and the necessary repairs made. When it is desired to test one of these trip components, the operator activates the corresponding lock-out component and performs the necessary test. The activation of this lock-out component has an effect of making the protective system output signal (the output to the actuated devices to correct the fault or shut the system down) independent of the output of that trip component when it is being tested. Should an operator mistakenly activate both lock-out components at once, the protective system output signal is a function only of the fault sensor input to a first trip component and a driving signal to the protective system. Thus, even if both lock-out components are activated at once, a fault signal to the first trip component will effect a fault output signal from the protective system to the actuated devices.

DESCRIPTION OF THE PREFERRED EMBODIMENT

Figure 1:
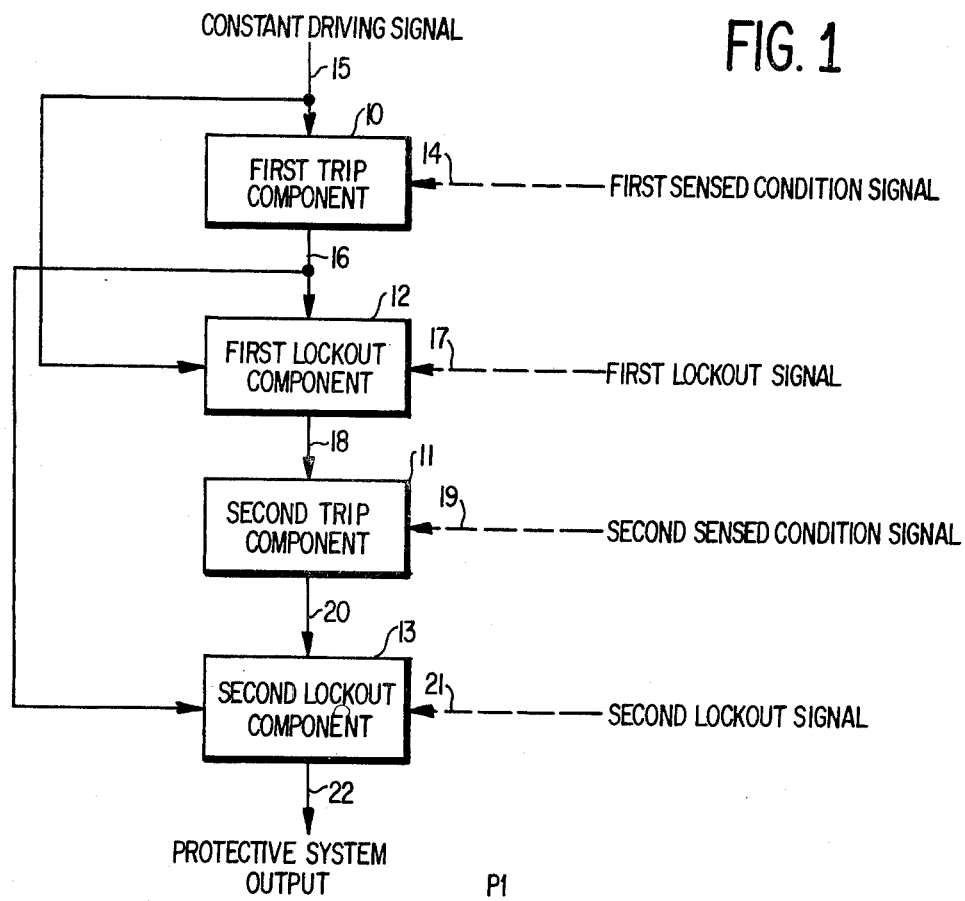
FIG. 1 is a schematic diagram of a protective system illustrating a preferred embodiment of the invention.

Referring to FIG. 1, there is shown a protective system for detecting variations in a sensed condition of an operating system and taking action to protect that operating system. The protective system comprises first and second trip components 10 and 11 connected in a circuit with first and second lock-out components 12 and 13. The first trip component 10 has inputs thereto of a first sensed condition signal 14 and a constant driving signal 15. The first sensed condition signal 14 is a signal from a suitable sensor (not shown) which senses a fault condition in an associated operating system.

Since the principle of operation of the protective system of the present invention is applicable to any type of testable protective system, the inputs and outputs to the protective system components of the present invention will be represented by logical or Boolean 0's and 1's. The first sensed condition signal 14 is represented as 1 if no fault is sensed and 0 if a fault is sensed. If no fault is sensed, the trip component will be in a reset mode; if a fault is sensed, the trip component will be in a tripped mode. A second input to the first trip component comprises a constant driving signal 15 which provides a driving force necessary for the operation of the protective system. This constant driving signal has a constant logical value of 1 when the protective system is operating normally. The output 16 of the first trip component 10 is 1, indicating that it is in a reset mode if both the constant driving signal 15 and the first sensed condition signal 14 are 1. Thus, the first trip component comprises a logical AND means since both inputs must have a value of 1 for the output to have a value of 1.

The output 16 of the first trip component 10 is fed to a first lock-out component 12 as an input thereto. The constant driving signal 15 is also fed to the first lock-out component as a second input thereto. A third input to the lock-out component comprises a first lock-out signal 17. When it is desired to test the first trip component the first lock-out component is activated by the operator through lock-out signal 17. That is, the value of the first lock-out signal 17 is changed from 0 (the value it has when the protective system is operating normally) to 1 indicating that the first trip component is being tested. The output 18 of the first lock-out component will have the same value as the constant driving signal 15 input to that component if the value of the first lock-out signal 17 is 1 (when the first trip component is being tested) or it will have the value of the first trip component output signal 16 if the value of the first lock-out signal 17 is 0 (normal operation). Therefore, it is readily seen that if only this first lock-out component is activated, the first trip component is effectively removed from the protective system so that the output of the protective system is independent of the output of the first trip component when that component is being tested by, for example, simulating an operating system fault by making the first sensed condition signal 14, 0.

Still referring to FIG. 1, there is shown a second trip component 11 the inputs thereto comprising the output 18 from the first lock-out component 12 and a second sensed condition signal 19. The second trip component comprises a logical AND means similar to the first trip component. The second sensed condition signal 19 like the first sensed condition signal 14 is a signal from a suitable sensor (not shown) which senses a fault in the associated operating system. This second sensed condition signal, like the first, has a value of 0 if the sensor senses a fault in the operating system and a value of 1 if no fault is detected. Like the first trip component, the second trip component will have an output 20 of 1 only if both inputs to that component have a value of 1.

The second trip component has associated with it a second lock-out component 13. This second lock-out component has inputs of the output 16 from the first trip component 10, the output 20 from the second trip component 11, and a second lock-out signal 21 which, as does the first lock-out signal 17, has a value of 1 when that component is activated and a value of 0 when it is not. The second lock-out component is activated (that is, the second lock-out signal 21 has a value of 1) only when the second trip component is to be tested.

As seen from FIG. 1, the output 22 of the second lock-out component 13 represents the output of the entire protective system. It constitutes a signal fed to certain actuated devices which may either correct the fault or shut the operating system down until the cause of the problem can be determined and the necessary repairs made. This protective system output has a value of 0 if the protective system has been tripped or 1 if it is in a reset mode.

Figure 2:
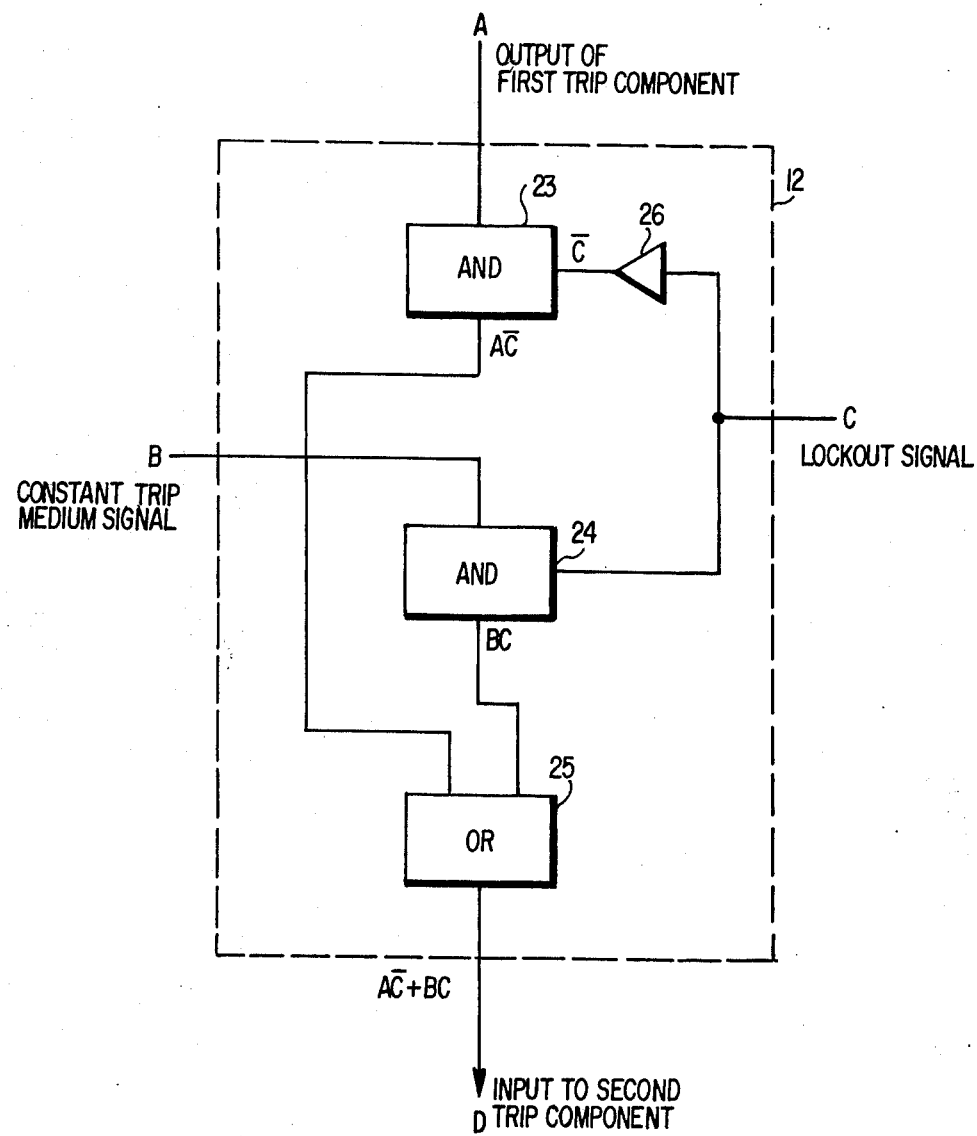
FIG. 2 is a logic diagram of a first lock-out component of FIG. 1.

Referring now to FIG. 2, there is shown a logic diagram of the first lock-out component 12. As can be seen from FIG. 2, this lock-out component comprises two logical AND means 23 and 24, a logical OR means 25 and an inverter 26. The first logical AND means 23 has inputs of A (which in this case is the output 16 of the first trip component) and $\overline{C}$. $\overline{C}$ is obtained by inverting a signal C (which in this case is the first lock-out signal 17). Therefore, the output of the first logical AND means is $A\overline{C}$. This output is fed to the logical OR means 25. The second logical AND means 24 has inputs of B and C where B in this case is the constant driving signal 15 and C is the first lock-out signal 17. Therefore, the output of the second logical AND means 20 is BC. Feeding the $A\overline{C}$ output from the first logical AND means 23 and the BC output from the second logical AND means 24 into the logical OR means 25 results in an output D for the entire lock-out component of $A\overline{C} + BC$. Thus, it can be seen that for this lock-out component, when the lock-out signal C is zero, that is, the component is inactivated, the output from the lock-out component will be the output A from the first trip component. However, if it is desired to test the first trip component, the lock-out device will be activated making the lock-out signal C 1 and the output D from the device the constant driving signal B.

Like the first lock-out component 12, the second lock-out component 13 may be described by the logic diagram of FIG. 2. However, for this second lock-out component 13 with respect to FIG. 2, A is the output 20 from the second trip component and B is the output 16 from the first trip component. C is the second lock-out signal. The output D from this second lock-out component is again $A\overline{C} + BC$.

Operation

Again referring to FIG. 1, when the first trip component 10 is being tested, the first lock-out component 12 is activated making the first lock-out signal 1 and the output 18 therefrom, (the input to the second trip component), the constant driving signal 15 which ordinarily has a value of 1. Therefore, if the sensors cooperating with the second trip component 11 sense a fault in the operating system, the output 20 of the second trip component will be 0. Ordinarily when the first lock-out component is activated in testing the first trip component the second lock-out component will not be activated. Therefore, the 0 input 20 of the second lock-out component 13 from the second trip component will become the output 22 from the entire protective system since the second lock-out signal has a value of 0.

Similarly, when the second trip component 11 is being tested the second lock-out component 13 is activated making the second lock-out signal 1 and the output 22 therefrom (the system output), the output 16 from the first trip component. Therefore, if the sensors cooperating with the first trip component 10 sense a fault in the operating system, the output 16 from the first trip component will be 0. Therefore, the system output 22 will have a value of 0 under these conditions. It can be seen then, that activation of any one lock-out component has the effect of making the output from the protective system independent of the output of the corresponding trip component and dependent only upon the output of the redundant trip component.

However, should an operator mistakenly activate both lock-out components, the protective system will still be responsive to any fault signals fed thereto by a fault sensor employed with the operating system. Referring to FIG. 1, if the first lock-out component 12 is activated the output therefrom has the value of the constant driving signal 15. However, if the second lock-out component is by mistake also activated, the output 22 from that component (the system output) will have the same value as the output 16 from the first trip component enabling the protective system to signal a fault from the first sensed condition signal 14 to the first trip component even though both lock-out components have been mistakenly activated.

Figure 3:
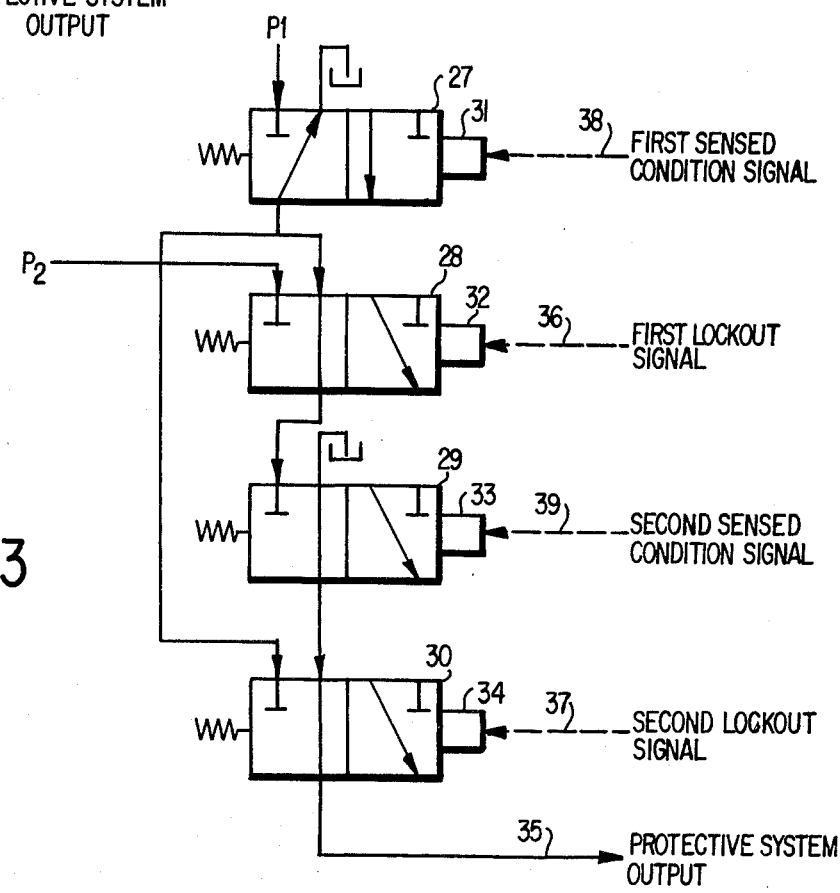
FIG. 3 is a simplified schematic drawing of the protective system of FIG. 1.

Referring now to FIG. 3, there is shown an implementation of the protective system of the present invention in the form of a hydraulic protective system. The system, as shown in FIG. 3 in standard symbolic notation, comprises four hydraulic valves 27, 28, 29, 30 each having individual actuators 31, 32, 33, 34, respectively, associated therewith. In general, the actuators may be mechanically or electrically operated. A constant hydraulic fluid pressure source $P_1$ is applied to a first trip valve 27 and a constant hydraulic fluid pressure source $P_2$ of the same magnitude is applied to a first lock-out valve 28. If it is desired to test the first trip valve 27, the first lock-out valve 28 is activated by its actuator 32 opening a passage between the constant hydraulic fluid pressure source $P_2$ and the first lock-out valve output. Similarly, a second trip valve 29 and an associated lock-out valve 30 are employed. Should it be desired to test the second trip valve 29, the second lock-out valve 30 is activated by its actuator 34 opening a passage from the first trip valve output to the second lock-out valve output. The output from the second lock-out valve is the system output 35. The lock-out valves 28 and 30 are activated by first and second lock-out signals 36 and 37, respectively, applied to the valve actuators 32 and 33, respectively. The trip valves 27 and 29 are activated by first and second sensed condition signals 38 and 39, respectively, to actuators 31 and 33 by operating system sensors (not shown). In FIG. 3, the trip valves 27 and 29 are shown in their tripped configuration. It can be seen that when the system is reset, a fluid passage is opened from the constant pressure source $P_1$ through the first trip valve, the first lock-out valve, the second trip valve, and the second lock-out valve. Therefore, when the system is reset, the system output 35 is hydraulic fluid of the same pressure as $P_1$ or $P_2$.

In FIG. 3 trip valves 27 and 29 are shown tripped. It should be noted that in this configuration, the passage between the constant fluid pressure source $P_1$ and the output of the trip valve 27 is blocked as is the passage between the output of the first lock-out valve 28 and the output of trip valve 29.

If either trip valve is to be tested the corresponding lock-out valve is actuated. When the first trip valve 27 is to be tested, first lock-out valve 28 is actuated opening a fluid passage from constant fluid pressure source $P_2$, through this lock-out valve to second trip valve 29. If second trip valve 29 is reset (no fault sensed condition signal applied to it) a fluid passage through this trip valve is open as is a passage through second lock-out valve and the constant fluid pressure source $P_2$ is applied to the system output 35. When the second trip valve 29 is to be tested, the second lock-out valve 30 is actuated opening a fluid passage from the output of the first trip valve 27 to the system output 35. If first trip valve 27 is reset, a fluid passage is opened between constant fluid pressure source $P_1$ and the output of this valve so that constant fluid pressure source $P_1$ is applied to the system output 35. It can be seen that if either trip valve is tripped while the other is being tested the passages between constant fluid pressure sources $P_1$ or $P_2$ and the system output 35 will be closed so that a zero pressure will be applied to the system output.

However, should both lock-out valves be mistakenly actuated a fluid passage between the output of the first trip valve 27 and the system output 35 is opened. Therefore, a first fault sensed condition signal 38 applied to actuator 31 will close the normally (reset mode) open passage between constant fluid pressure source $P_1$ and the system output 35, applying a zero pressure to system output 35 actuating the suitable actuated devices to either correct the fault or shut the operating system down.

Therefore, it can be seen that the present invention provides an improved protective system wherein the mistaken attempt to simultaneously test redundant trip components in that system will not make the system insensitive to faults occurring in the operating system with which this protective system is employed. Rather, such a mistaken actuation of the lock-out components will make the protective system insensitive to any fault signals applied to only one of the trip components insuring the continued effective operation of the protective system by the continual effective operation of the redundant trip component.

Modifications of the apparatus disclosed herein may be employed by those skilled in the art without departing from this invention and it is intended by the appended claims to cover such modifications.

What is claimed as new and desired to be secured by Letters Patent of the United States is:

1. In a testable protective system for detecting variations in a sensed condition of an operating system and taking action to protect said operating system, the combination of:
   a first trip responsive to said sensed condition and providing an output indicative of variations of said sensed condition;
   a first lock-out component serially connected to the output of said first trip component, said first lock-out component including means for making the output of said protective system independent of the output of said first trip component when the first trip component is being tested;
   a second trip component serially connected to the first lock-out component, said second trip component responsive to said sensed condition and providing an output indicative of said sensed condition;
   a second lock-out component serially connected to the output of said second trip component, said second lock-out component including means for making the output of said protective system independent of the output of said second trip component when the second trip component is being tested;
   wherein, said first and second trip components each comprise logical AND means; and,
   said first and second lock-out components each comprise logical means performing the logical function characterized by the Boolean expression:

$$A\bar{C} + BC = D$$

where $D$ is the output of the logical means and $A$, $B$ and $C$ are inputs thereto.

2. The testable protective system of claim 1, wherein:

said first trip component has inputs thereto comprising a constant driving signal and a first sensed condition signal, said second trip component has inputs thereto comprising the output of said first lock-out device and a second sensed condition signal, and wherein, for the first lock-out component:
- A is the output of the first trip component,
- B is the constant driving signal,
- C is a first lock-out signal, and wherein, for the second lock-out component:
- A is the output from the second trip component,
- B is the output from the first trip component,
- C is a second lock-out signal.

3. In a testable protective system for detecting variations in a sensed condition of an operating system and taking action to protect said operating system, the combination of:

a constant driving signal for driving said protective system;

a first trip component comprising a logic AND means, said first trip component having a first input from said constant driving signal and a second input from said operating system;

a first lock-out component serially connected to the output of said first trip component, said first lock-out component comprising logic means performing the logic function characterized by the Boolean expression:

$$A\overline{C} + BC = D$$

wherein $D$ is the output of the first lock-out component, $A$ is the output of the first trip component, $B$ is the constant driving signal and $C$ is a lockout signal;

a second trip component comprising a logic AND means, said second trip component having a first input comprising the output of the first lock-out component and a second input from said operating system; and, a second lock-out component serially connected to the output of said second trip component, said second lock-out component comprising logic means performing the logic function characterized by the Boolean expression:

$$A\overline{C} + BC = D$$

wherein $D$ is the output of the protective system, $A$ is the output of the second trip component, $B$ is the output of the first trip component and $C$ is a lockout signal.

4. The protective system recited in claim 3 wherein said first and second lock-out components each comprise:

a first logic AND means receiving the signal inputs $A\overline{C}$ and providing a first logic output signal;

a second logic AND means receiving the signal inputs $BC$ and providing a second logic output signal; and, a first logic OR means receiving said first and second logic output signals and providing a logic output signal D.

* * * * *